May 27, 1930.  O. T. NICHOL  1,760,079
TRACTOR GUIDE
Filed Sept. 14, 1928  4 Sheets-Sheet 2
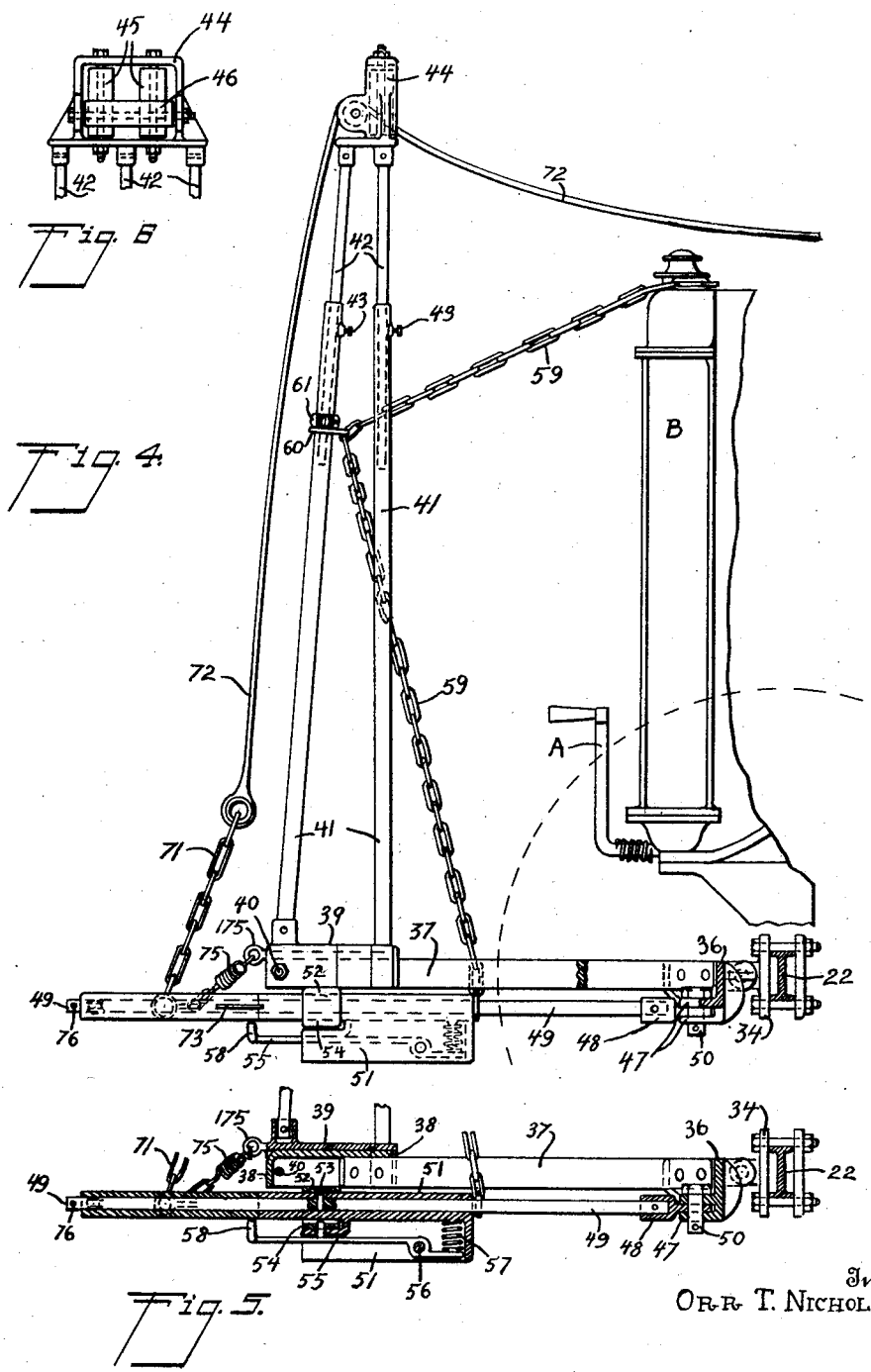
Inventor
ORR T. NICHOL.
By David O. Barnell
Attorney May 27, 1930. O. T. NICHOL 1,760,079
TRACTOR GUIDE
Filed Sept. 14, 1928 4 Sheets-Sheet 3
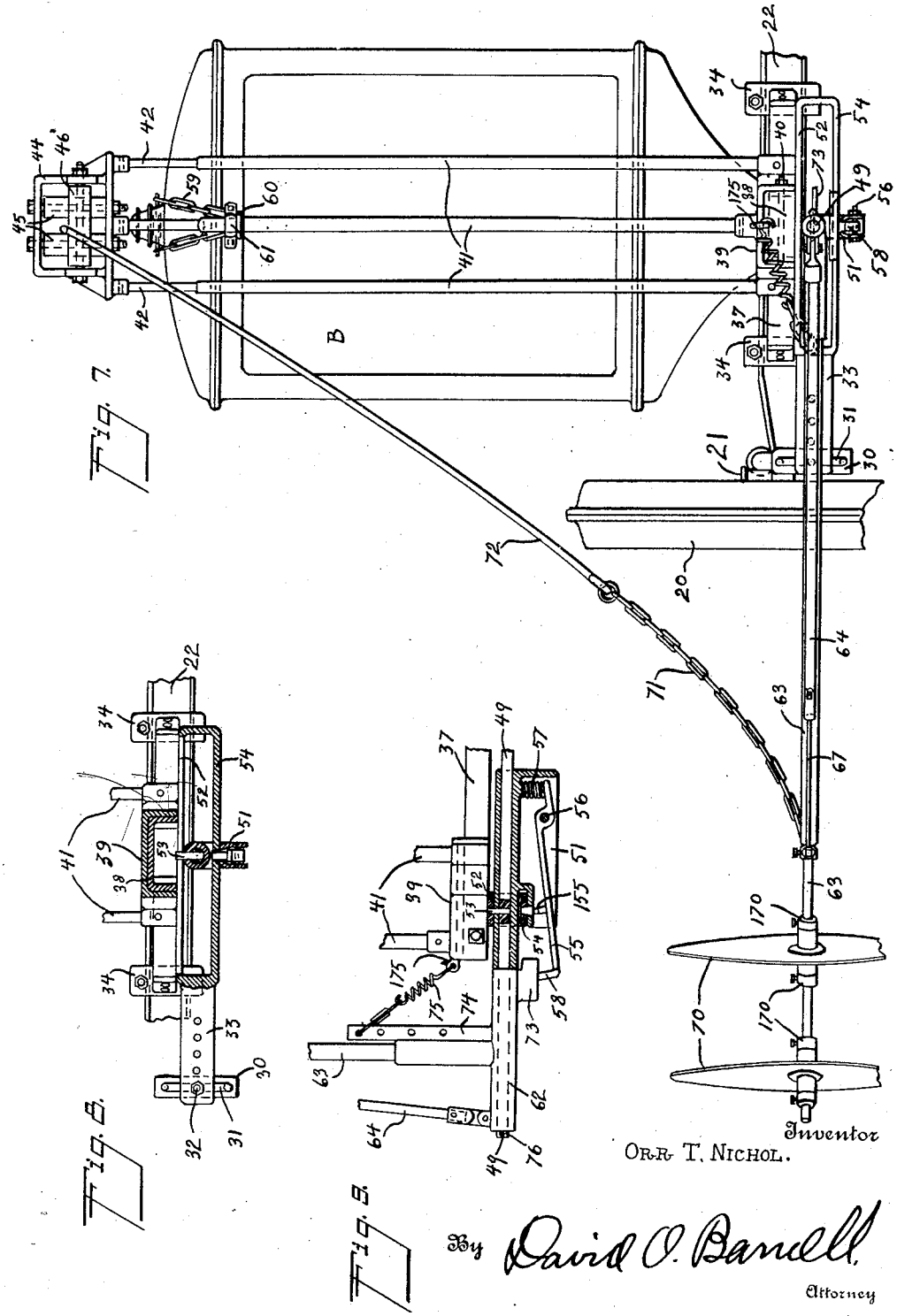
Inventor
ORR T. NICHOL.
By David O. Barnell
Attorney

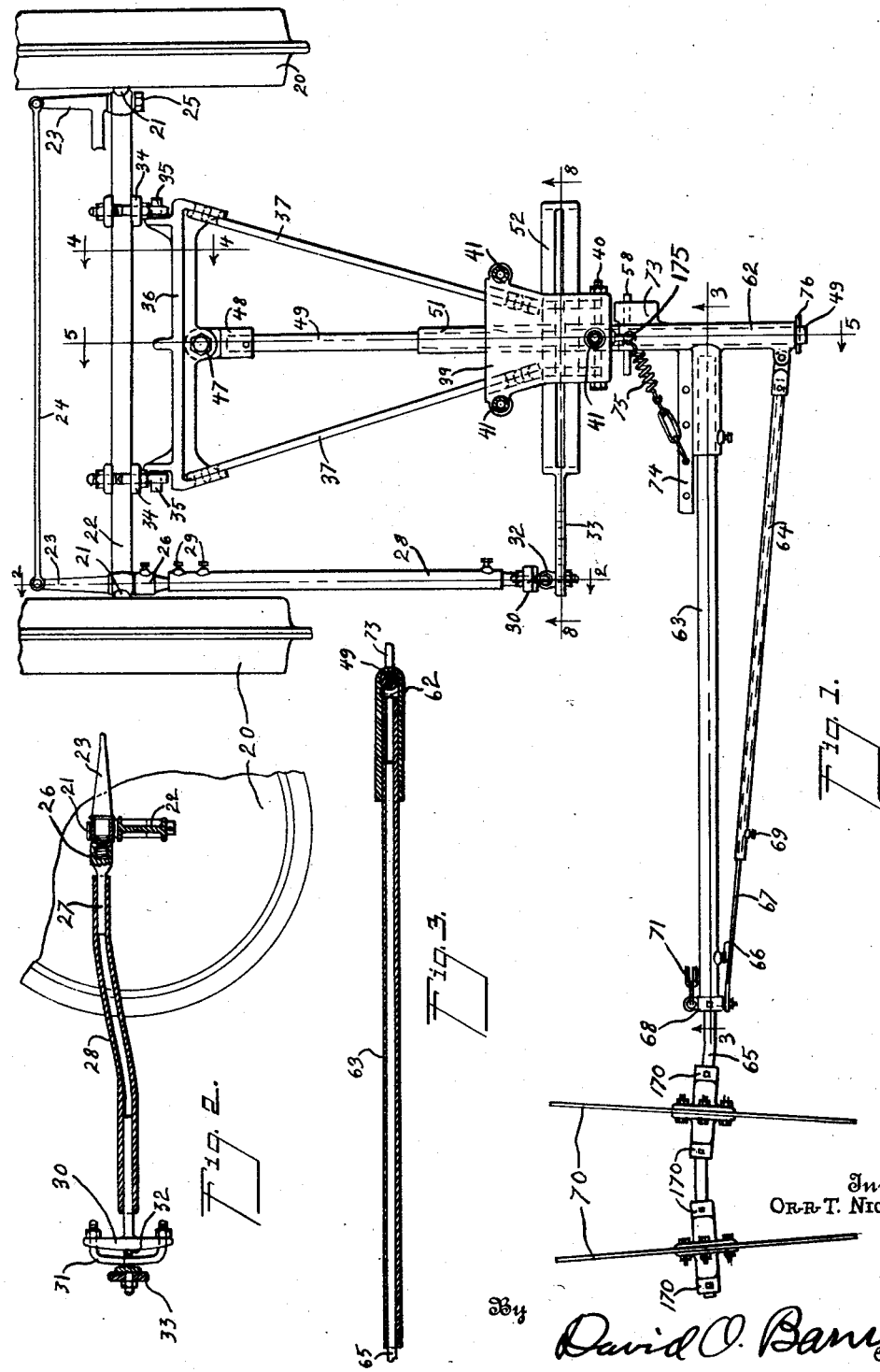

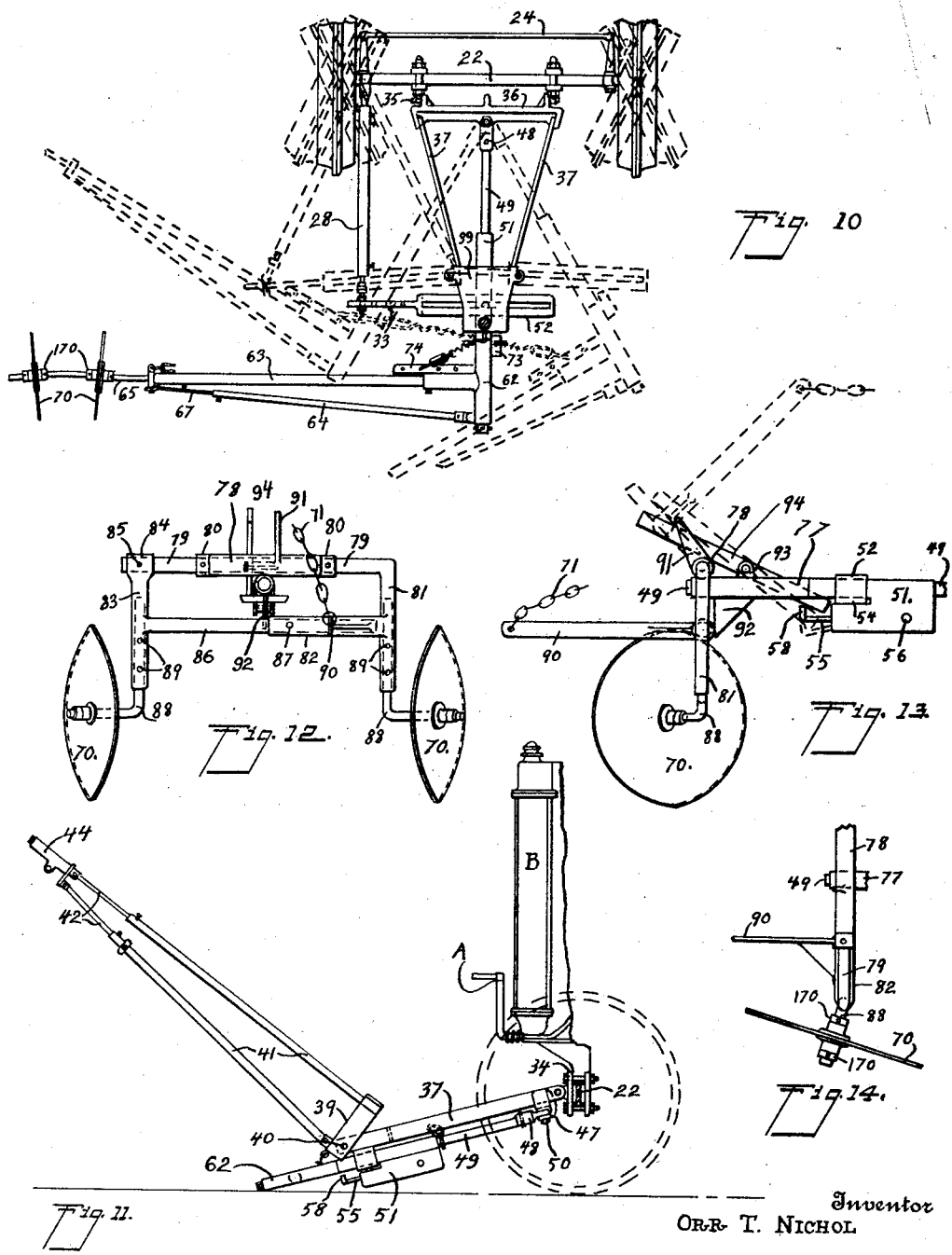

Patented May 27, 1930

1,760,079

UNITED STATES PATENT OFFICE

ORR T. NICHOL, OF OMAHA, NEBRASKA, ASSIGNOR TO NICHOL MANUFACTURING COMPANY, A CORPORATION OF NEBRASKA

TRACTOR GUIDE

Application filed September 14, 1928. Serial No. 305,951.

My invention relates to automatic guiding attachments for motor-propelled plows, cultivators, listers, and other agricultural implements which produce furrows, or which are used upon ground having furrows or ridges which may be engaged by pilot-members to guide the motor vehicle. It is the object of my invention to provide, for tractors of standard design whereof the steering-wheels are mounted upon knuckles pivoted to the ends of a fixed transverse axle, a simple, inexpensive, durable and efficient, automatic guiding device which may be easily and quickly attached to and detached from the tractor. A further object is to provide an automatic guiding mechanism of the foregoing character in which the pilot-members, which engage the guiding ridge or furrow of the ground, may be easily shifted to either side of the line of travel of the tractor, or raised to an inoperative position when it is desired to steer the tractor manually. A further object is to provide automatically operated means for uncoupling the guiding devices from the steering mechanism of the tractor when the pilot-members are raised to inoperative position, and for coupling said guiding devices with the tractor steering mechanism when the pilot-members are in ground-engaging position at either side, or at the center, of the line of travel of the tractor, whereby when the pilot-members are at inoperative positions the automatic guiding mechanism will not interfere in any way with the use of the manual steering mechanism. A further object of my invention is to provide automatic guiding devices constructed and arranged to afford free access to the front of the tractor, for use of the starting-crank, inspecting and filling the radiator, and the like. A further object is to provide, in an automatic guiding attachment for tractors, simple and positive means of adjustment whereby the guiding devices may be adapted for use with tractors of various kinds, and said tractors adapted for use with various implements, such as plows, two-row and three-row listers, and cultivators, which the automatically guided tractor is desired to propel.

A structure embodying my invention is illustrated in the accompanying drawings, in which Fig. 1 is a plan view of the guiding attachment and portions of the tractor on which it is used, Fig. 2 is a detail vertical section on the line 2—2 of Fig. 1, Fig. 3 is a detail vertical section on the line 3—3 of Fig. 1, Fig. 4 is a side elevation of the guiding attachment, partly in section on the line 4—4 of Fig. 1, Fig. 5 is a detail vertical section on the line 5—5 of Fig. 1, Fig. 6 is a detail front view of the hoist-head, Fig. 7 is a front elevation of the guiding attachment, Fig. 8 is a detail vertical section on the line 8—8 of Fig. 1, Fig. 9 is a side elevation, partly in section on the line 5—5 of Fig. 1, showing the uncoupled position of the latch device, Fig. 10 is a diagrammatic plan view showing extreme positions of the pilot devices, Fig. 11 is a diagrammatic side view showing the hoist-standard tilted forward for cranking the tractor, Fig. 12 is a front view of the cultivating guide attachment, Fig. 13 is a side view of the same, and Fig. 14 is a partial plan view thereof.

The guiding attachment shown is adapted for use on the ordinary forms of tractors, of which the front wheels 20 are mounted on steering-knuckles 21 pivoted at the ends of the front axle 22, the knuckles having arms 23 which are connected by the cross-rod 24, and these steering devices having the usual connections with a steering-wheel for manual steering of the tractor. The knuckle-arms 23 usually extend through bosses at the inner sides of the steering-knuckles 21, and are retained therein by nuts 25 screwed on the threaded ends of the arms which protrude from the front ends of the bosses. When a tractor is to be equipped with my guiding attachment, I preferably replace one of the nuts 25 with a special nut 26 having a stem 27 formed integrally therewith, as best shown in Fig. 2. This special nut 26 is left upon the tractor permanently, and when the guiding attachment is to be used a tubular arm 28 is passed over said stem 27 and secured thereon by set-screws 29, so that said arm 28 extends forwardly from the knuckle, parallel with the adjacent wheel 20. At the front end of the arm 28 is secured a T-head 30, said head extending vertically and carrying a U-bolt 31 of which the intermediate portion is slightly curved, as indicated in Fig. 2. The curved intermediate portion of the U-bolt is slidably engaged by the eye of an eye-bolt 32, and the stem of said eye-bolt is secured selectively in one of a series of holes in the flat terminal portion 33 of the coupling-member by which the motion of the pilot devices is transmitted to said arm 28 and the steering-knuckles of the tractor.

Trunnion-plates 34 are clamped detachably to the axle 22 of the tractor, said plates 34 having forwardly projecting, transversely perforate lugs formed integrally therewith and adapted to receive the trunnion-pins 35 of the yoke-member 36. Bars 37 are fixedly secured to the member 36 and extend forward therefrom convergingly, and to the front ends of said bars 37 is fixedly secured the front yoke-member 38. The members 36, 37 and 38 form a rigid, approximately triangular yoke which is movable pivotally about the horizontal axis of the pins 35. The base 39 of the hoist-standard rests normally upon the front yoke-member 38, said base 39 having flanges which straddle over the sides of said member, and the base is pivotally connected with the yoke-member by a transverse bolt 40 extending through the flanges of the base, as shown. The base 39 has triangularly arranged vertical sockets formed integrally therewith, and in said sockets are secured the lower ends of the tubular posts 41. Rods 42 telescope, or fit slidingly, in the upper ends of said posts 41, and are secured at adjusted positions therein by set-screws 43, said rods 42 supporting at their upper ends the hoist-head 44. Said head 44 is an open rectangular frame having at the lower side thereof suitable sockets for receiving the ends of the supporting-rods 42, and having revolubly mounted therein a pair of vertical rollers 45 and a horizontal roller 46, the latter being arranged in front of the lower portions of the vertical rollers 45. The base 39, head 44, and telescoping connecting members 41 and 42, comprise the hoist-standard, which may be tilted forward as shown in Fig. 11, the transverse pivot-bolt 40 serving as the fulcrum for the tilting movement.

On the lower central portion of the yoke-member 36 are a pair of lugs 47, between which is pivotally held the rear end-piece 48 of the guide-tongue 49, the latter being a straight cylindrical bar, and the pivotal connection with the lugs 47 being made by a vertical pin 50. On the intermediate portion of the guide-tongue 49, beneath the front yoke-member 38, the latch-block 51 is fixedly secured to said tongue. The upper front portion of the latch-block is substantially a cylindrical sleeve surrounding concentrically the tongue-bar 49, as shown in Fig. 8. Said sleeve portion of the block is straddled by the head-portion of the coupling-member, which comprises an upper plate 52 and a lower plate 54, formed integrally with the flat terminal portion 33. The upper plate 52 is longitudinally slotted, and into said longitudinal slot is extended the upper portion of a pin 53 affixed in the latch-block and tongue-bar, as best indicated in Figs. 5, 8 and 9. The lower plate 54 of the coupling-head has a single central opening therein, for engagement with the latch-pin. The lower portion of the latch-block 51 is hollow or channel-shaped, and the front end of said channel-portion extends beneath the plate 54, the upper side of said portion having therein an opening which is alined vertically with the pin 53. The latch 55 is pivoted within the lower rear portion of the latch-block, on a transverse pin 56, said latch having a tail portion which is engaged by a spring 57 as best shown in Figs. 5 and 9. Said spring 57 tends to push upwardly the front portion of the latch, whereby the latch-pin 155 is raised to extend through the opening in the block, and to enter the central opening in the plate 54 when said opening is in register with the pin. At the front end of the latch 55 is a transversely extending head 58 which may be engaged, by means hereinafter described, to push the latch downwardly as shown in Fig. 9, thereby disengaging the latch-pin 155 from the plate 54 of the coupling-member, and allowing said member to move freely laterally of the guide-tongue.

A chain 59 is connected with the guide-tongue adjoining the rear end of the latch-block 51, and extends therefrom upwardly to a ring 60 disposed upon the front post 41 of the hoist-standard, beneath a stop-collar 61 secured adjustably upon said post. From the ring 60 the chain 59 extends upwardly and rearwardly, and its terminal portion is formed into a loop which extends about the cap of the radiator B of the tractor. Said chain 59 serves to support the guide-tongue normally in an approximately horizontal position, as shown in Fig. 4, and also pulls rearwardly upon the upper portion of the hoist-standard, whereby the latter is retained normally in the vertical position shown in said figure. When the looped portion of the chain 59 is disengaged from the radiator, the guide-tongue and the yoke 37 are permitted to drop down to an inclined position, and the hoist-standard to be tilted forwardly, as shown in Fig. 11, thereby clearing the front of the tractor for use of the starting-crank A, filling or inspecting the radiator B, or similar purposes.

On the portion of the guide-tongue 49 which extends forwardly from the latch-block 51, is mounted pivotally the head 62 of the pilot-arm, which comprises a tubular member 63 secured to and extending transversely from the intermediate portion of said head 62, a tubular tension-member 64 connected pivotally with the front portion of the head 62, a rod 65 fitting slidably in the tubular member 63 and held in adjusted relations thereto by a set-screw 66, and a tension-rod 67 connected with a collar 68 on the rod 65 and fitting slidably in the tubular tension-member 64, and held in adjusted relations thereto by a set-screw 69. On the outer end portion of the rod 65 are revolubly mounted the pilot-disks 70 which are retained on the rod by collars 170 secured removably on the rod adjoining the hubs of the disks, as shown. Preferably, portions of the rod 65 are slightly bowed or bent adjacent to the pilot-disks, whereby the planes of rotation of the disks are caused to converge forwardly, as shown in Fig. 1.

To the collar 68 of the pilot-arm is connected a flexible hoisting-member, of which the lower portion is preferably a chain 71, and the remainder a rope or cable 72, which is extended over the roller 46 and between the rollers 45 of the hoist-head 44, and thence rearwardly to a point readily accessible to the operator of the tractor. By pulling upon the cable 72, the pilot-arm may be raised to a vertical position in front of the hoist-standard, and either retained in said position, or lowered to a horizontal position extending either to the right or left side of the guide-tongue. In the several Figs. 1, 4, 5, 7 and 10, the pilot-arm is shown as extending to the right, but the reversibility thereof will be apparent. In Fig. 9 the indicated portion of the pilot-arm is in the vertical position. At the rear end of the head 62, on the side thereof opposite the members 63 and 64, is a cam-lug 73 which is adapted to engage the latch-head 58 when the pilot-arm is turned to the vertical position, and to press the latch downwardly to uncoupling position thereof shown in Fig. 9.

A perforate bar 74 is formed integrally with the head 62 and extends therefrom laterally, parallel with the member 63. In one of the several holes in said bar 74 is connected the end of a tension-member which includes a spring 75, and the other end of said tension-member is connected with an eye 175 at the front end of the base 39. Said tension-member tends to retain the guide-tongue in the central position shown in Fig. 1, by pulling inwardly thereon when the tongue has been deflected laterally toward the side to which the pilot-arm extends. Also, when the pilot-arm is in the raised position shown in Fig. 9, and the guide-tongue thereby uncoupled from the steering devices of the tractor, said tension-member 75 serves to stabilize and inhibit lateral swinging of the guide-tongue.

In the use of the described automatic guiding attachment, the pilot-disks 70 are disposed in a furrow, or between ridges, previously formed and extending parallel with the path in which it is desired that the tractor be directed. Any deviation of the guiding furrow or ridges from the path in which the tractor is moving causes a side-pressure to be exerted on one of the pilot-disks, with the result that the guide-tongue is moved laterally, swinging about the pivot-pin 50 at the rear end thereof, and said lateral swinging movement of the guide-tongue is communicated by the coupling-member 33—52—54 to the arm 28, whereby the steering mechanism of the tractor is suitably actuated to guide the tractor-wheels 20 in a path corresponding with the deviation of the furrow or ridges. Similarly, when the guiding furrow or ridges are straight, any tendency of the tractor to swerve from a rectilinear path, such as might be caused by obstructions or roughness of the ground-surface encountered by the wheels 20, will be resisted by the pilot devices, and the path of the tractor thus kept straight. When the tractor is employed for plowing operations, it is steered manually for the "laying out" of the first furrow which, if desired, may have the form of a closed circuitous path; and after the completion of the first furrow the pilot-disks may be disposed therein to guide the tractor automatically. During the laying out operation, or at any time when the tractor is to be steered manually, as when turning at the end of a field to traverse the same in an opposite direction, the pilot-arm is raised to its vertical position by means of a flexible hoisting-member connected therewith. At said raised position of the pilot-arm the guide mechanism is automatically uncoupled from the steering mechanism as before described, so that the operator when steering the tractor manually does not move the pilot devices from side to side, and the manual steering may be effected as easily as if the guiding devices were not carried upon the machine. When the pilot-arm is lowered to its operating position at which the disks 70 are engaged with the ground, the latch 55 is permitted to raise to position for engaging the coupling-member, and if the opening in the plate 54 is not in register with the latch-pin, the steering devices may be moved to actuate the coupling-member until the hole and latch-pin come into register, and the coupling is then completed automatically. Preferably the latch-pin and the hole therefor in the plate 54 are made slightly tapering to facilitate the entry of the pin. The pin 53 serves to so guide the lateral movements of the coupling-member relative to the latch-block as to insure registry of the latch-pin and hole when the arm 28 is swung to a position corresponding with that of the guide-tongue.

The telescoping members 63, 64, 65 and 67 of the pilot-arm permit said arm to be extended or retracted, for engaging the pilot-disks in furrows or between ridges at any desired distance laterally from the path of the tractor. When the pilot-arm is extended, the height of the hoist-standard is similarly adjusted by means of the telescoping members 41 and 42, so that for any extension of the pilot-arm the height of the standard will be equal thereto, and substantially the same tension upon the hoisting-member 72 will suffice to pull the pilot-arm to its raised position.

During the operation of the guiding mechanism, the usual irregularities of the ground-level are accommodated by swinging of the pilot-arm about the pivotal axis of the head 62 on the guide-tongue 49, and the guide-tongue and hoist-standard-yoke 37 may also have some vertical movement by pivoting about the axis of the trunnion-pins 35, the chain 59 limiting downward movement of these parts, but allowing the same to be raised freely. The connection formed between the U-bolt 31 and eye-bolt 32 allows the required vertical play between the coupling-member 33 and guide-arm 28, without permitting lateral lost-motion in the connection.

When the automatic guiding attachment is to be removed from the tractor, it is merely necessary to disengage the loop of the chain 59 from the radiator-cap, loosen the set-screws 29 and remove the tubular guide-arm 28 from the nut-stem 27, loosen the clamp-bolts of one of the trunnion-plates 34, move said plate along the axle 22 far enough to disengage the plate from the trunnion-pin 35, and finally slide the other trunnion-pin out of engagement with the other plate 34. By the reverse of these simple operations the guiding device is attached to the tractor.

For use of the guiding mechanism when cultivating, or for any similar operation in which the tractor-wheels straddle the guiding furrow or ridges, the pilot-arm is removed from the front end of the guide-tongue 49, on which the head 62 is normally retained by a cotter-pin 76, and the device shown in Figs. 12, 13 and 14 is substituted for the pilot-arm. In said cultivating-guide device the head-member 77 is affixed to the guide-tongue 49 by means of set-screws (not shown). The member 77 has formed integrally therewith a transversely extending tubular portion or bearing 78 in which is mounted pivotally the upper horizontal member 79 of the guide-frame, said member 79 being retained longitudinally of the bearing by means of set-collars 80. A vertical tubular socket-member 81 is formed integrally with one end of the member 79, and from the side of the socket-member 81 a tubular arm 82 is extended laterally parallel with the member 79. A socket-member 83, similar to the member 81, has a tubular T-head 84 which fits slidably upon the portion of the member 79 which projects through the bearing 78, and said head 84 is secured in place adjustably by means of a set-screw 85. Projecting laterally from the socket-member 83 is an arm 86 which fits slidably in the tubular arm 82, and is secured in adjusted positions therein by a set-screw 87. In the socket-members 81 and 83 the stem portions of L-shaped rods 88 are secured adjustably by means of set-screws 89. The horizontal arms of the rods 88 extend laterally from the frame, being inclined slightly forward from a plane transverse to the guide-tongue 49, and upon said arms the pilot-disks 70 are mounted revolubly, being retained laterally by the collars 170, said pilot-disks and collars being removed from the rod 65 of the pilot-arm when the cultivating-guide is to be used. A hoist-arm 90 is extended forwardly from the arm 82 of the guide-frame, and to said arm is connected the hoist-chain 71. By tension upon the hoist-member the guide-frame may be swung forwardly and upwardly, about the axis of the member 79 in the bearing 78, to an extreme position indicated by dotted lines in Fig. 13, at which the swinging movement is limited by engagement of the arm 82 with a stop-lug 91 formed integrally with and extending upwardly from the bearing 78. A stop-lug 92, extending downwardly from the head 77, is engaged by the arm 82 or arm 86 to prevent the guide-frame swinging rearwardly beyond the position at which the socket-members 81 and 83 are vertical, as shown in Figs. 12 and 13. On the head-member 77 is an upwardly extending lug 93 on which is pivoted a lever 94. Said lever is normally at an inclined position as shown in Fig. 13, the front portion of the lever extending over the bearing 78, and the rear portion adjoining the head 58 of the coupling-latch. When the guide-frame is swung up to the raised position above mentioned, the front portion of the lever 94 is engaged and lifted by the arm 86 of the frame, and the rear end of the lever caused to press the latch-head 58 downwardly to the uncoupling position, as indicated by dotted lines in Fig. 13. The width of the guide-frame may be varied by adjusting the position of the head 84 on the member 79, and of the arm 86 in the arm 82, and the lateral spacing of the pilot-disks thus suited to the spacing of the ridges to be engaged by the disks for guiding the tractor. The guide-frame may be centered with the bearing 78, or given an unequal lateral extension therefrom, by varying the positions of the set-collars 80 on the member 79. The angular relation of the pilot-disks to the line of travel may also be varied by loosening the set-screws 89, and turning the vertical portions of the rods 88 in the sockets 81 and 83.

Now, having described my invention, what

I claim and desire to secure by Letters Patent is:

1. Automatic guiding means for tractors of the class having wheels mounted on steering-knuckles pivoted at the ends of a fixed transverse axle, comprising a guide-tongue connected at its rear end with the tractor-axle and swingable about a vertical axis adjoining said axle, pilot devices mounted pivotally upon the front end portion of said guide-tongue, hoisting means connected with said pilot devices for moving the same from ground-engaging position to a position elevated above the guide-tongue, a guide-arm secured to the tractor-steering means and projecting forwardly therefrom, means normally coupling the guide-tongue with said guide-arm whereby the latter is moved in accordance with the lateral swinging movements of the guide-tongue, and means actuated by elevating of the pilot devices for disconnecting said coupling means from the guide-tongue.

2. Guiding means for tractors having wheels mounted on steering-knuckles pivoted at the ends of a fixed transverse axle, comprising a yoke-member connected with said axle and movable about an axis parallel therewith, a laterally swingable guide-tongue connected pivotally with the central portion of said yoke-member and extending forwardly therefrom, a pilot-arm mounted upon the front portion of said guide-tongue and swingable in a transverse vertical plane to extend laterally therefrom in opposite directions, ground-engaging members carried by said pilot-arm, a guide-arm extended forwardly from one of the steering-knuckles of the tractor, coupling means connected with said guide-arm and normally connected with an intermediate portion of said guide-tongue, a hoist-standard carried by said yoke-member, a flexible hoist-member guided in the upper portion of said standard and connected with said pilot-arm for swinging the same about the guide-tongue to elevate the ground-engaging members, and means carried by said pilot-arm and operable to disconnect the guide-tongue from said coupling means when the ground-engaging members are in elevated position.

3. In a tractor of the class having wheels mounted on steering-knuckles pivoted at the ends of a fixed transverse axle, a tractor-guiding attachment having a forwardly extending guide-tongue, pilot devices connected pivotally with the front portion of said guide-tongue and movable about the same from a lowered operating position to an elevated inoperative position, a coupling member connected with the tractor-steering means and engaging slidably an intermediate portion of the guide-tongue, means for elevating the pilot devices to said inoperative position, a latch for detachably connecting said coupling means with the intermediate portion of the guide-tongue, and means for actuating said latch to a releasing position when the pilot devices are elevated to inoperative position.

4. In a guiding mechanism for tractors of the class having wheels mounted on steering-knuckles pivoted at the ends of a fixed transverse axle, a yoke-member connected with the tractor axle and movable about an axis parallel therewith, a laterally swingable guide-tongue connected pivotally with the central portion of said yoke-member and extending forwardly therefrom, a pilot-arm mounted upon the front portion of said guide-tongue and swingable in a transverse vertical plane to extend laterally therefrom in opposite directions, ground-engaging members carried by said pilot-arm, means for coupling the guide-tongue with the steering mechanism of the tractor whereby the latter is actuated in accordance with the lateral swinging movements of the guide-tongue, a hoist-standard carried by said yoke-member, a flexible member guided in the upper portion of said hoist-standard and connected with said pilot-arm for swinging the same about the guide-tongue and elevating the ground-engaging members, the hoist-standard and pilot-arm each comprising telescoping members whereby the height of the former and the length of the latter are adjustable to correspond with each other, and means for retaining said telescoping members in adjusted relations 5. In a tractor of the class having wheels mounted on steering-knuckles pivoted at the ends of a fixed transverse axle, a tractor-guiding attachment having a forwardly extending guide-tongue, pilot devices connected pivotally with the front portion of said guide-tongue and movable about the same from a lowered operating position to an elevated inoperative position, a coupling member connected with the steering mechanism of the tractor and engaging an intermediate portion of the guide-tongue, means for elevating the pilot devices to said inoperative position, means detachably connecting said coupling means with the guide-tongue, means for releasing said connecting means when the pilot devices are elevated to inoperative position, and means inhibiting lateral swinging of the guide-tongue when the pilot devices are elevated.

6. In a tractor-guiding attachment for tractors of the class having wheels mounted on steering-knuckles pivoted at the ends of a fixed transverse axle, a yoke-member extending forwardly from the tractor-axle and detachably connected therewith to swing about an axis parallel thereto, a standard mounted on the front portion of said yoke-member and connected therewith to tilt forwardly from a normal vertical position, a guide-tongue connected with the rear portion of said yoke-member to swing about a vertical axis, a flexible supporting member extending from the upper front portion of the tractor-body and connected with said standard and guide-tongue to sustain the latter and the yoke-member in a substantially horizontal plane, pilot devices mounted pivotally upon the front portion of the guide-tongue and swingable from ground-engaging positions to an elevated inoperative position, hoisting means extending from the upper portion of said standard to the pilot devices and operable to raise the latter to said elevated position, a coupling-member operatively connected with the steering mechanism of the tractor and slidably engaging an intermediate portion of the guide-tongue, a latch for connecting said coupling-member and the guide-tongue to communicate movements of the latter to said member, and means connected with the pilot devices for releasing said latch when the pilot devices are raised to inoperative position.

7. In a tractor-guiding attachment for tractors of the class having wheels mounted on steering-knuckles pivoted at the ends of a fixed transverse axle, the combination with a guide-tongue connected pivotally with the axle of the tractor and extending forwardly therefrom, pilot devices connected pivotally with the front portion of said guide-tongue and movable about the same from opposite laterally extending positions to an elevated inoperative position, and means operatively connecting said guide-tongue with the steering mechanism of the tractor, of a yoke connected with the axle and extending forwardly therefrom, a hoist-standard mounted tiltably upon said yoke and normally extending upwardly therefrom in front of the tractor-body, flexible hoisting means connected with the pilot devices and guided in the upper portion of said hoist-standard, and means normally connecting the hoist-standard with the upper front portion of the tractor-body to maintain said standard in erect position, said connecting means being releasable from the tractor-body to enable tilting of said standard to clear the front of the tractor-body.

8. In an automatic guiding attachment for tractors having wheels mounted on steering-knuckles at the ends of a fixed transverse axle, a horizontal forwardly projecting stem affixed permanently to one of said steering-knuckles, a tubular arm detachably secured to and extended forwardly from said stem, a coupling-member connected with the front portion of said arm and movable pivotally relatively thereto in a horizontal plane, trunnion-plates detachably connected with the intermediate portion of the tractor axle, a yoke connected with said trunnion-plates to swing about an axis parallel with the axle, a guide-tongue connected with said yoke to swing about a vertical axis adjacent to the axle, pilot devices mounted upon the front portion of said guide-tongue, means normally supporting said yoke and guide-tongue in substantially horizontal position, a hoist-standard supported upon the yoke, and flexible hoisting means extending from the upper portion of said standard to the pilot-devices.

9. In a guiding attachment for tractors of the class having wheels mounted on steering-knuckles pivoted at the ends of a fixed transverse axle, a guide-arm rigidly secured to and extending forwardly from a steering-knuckle of the tractor, a guide-tongue extending forwardly from the central portion of the tractor-axle and connected therewith to swing horizontally and to swing vertically about an axis parallel with the axle, pilot devices carried on the front portion of said guide-tongue, a coupling-member extending transversely between the guide-arm and guide-tongue and connected with the latter by vertical pivoting means, an eye having a vertical opening and affixed to the coupling-member adjacent to the guide-arm, and a bolt affixed to the guide-arm and extending arcuately in a vertical plane and passing slidably through said eye to enable relative movement of the guide-arm and coupling-member vertically while communicating horizontal motion from one to the other.

10. In a tractor-guiding attachment for tractors of the class having wheels mounted on steering-knuckles pivoted at the ends of a fixed transverse axle, a yoke-member extending forwardly from the tractor axle and connected therewith to swing about an axis parallel therewith, a guide-tongue connected with said yoke-member to swing about a vertical axis adjacent to the axle, pilot devices mounted upon the front portion of said guide-tongue and swingable in a plane transverse thereto from ground-engaging positions to an elevated inoperative position, a coupling-member normally connecting said guide-tongue and the steering mechanism of the tractor, means actuated by movement of the pilot devices to elevated position and operating to disconnect said coupling member from the guide-tongue, a standard mounted tiltably upon the front portion of said yoke-member, hoisting means connected with the pilot devices and extending therefrom to the upper portion of said standard, and a flexible supporting member connected with the guide-tongue and said tiltable standard and detachably connected with the upper front portion of the tractor-body

ORR T. NICHOL.